(12) United States Patent
Keeley et al.

(10) Patent No.: US 8,379,665 B2
(45) Date of Patent: Feb. 19, 2013

(54) APPARATUS AND METHODS FOR ACCESS FAIRNESS FOR A MULTIPLE TARGET BRIDGE/ROUTER IN A FIBRE CHANNEL ARBITRATED LOOP SYSTEM

(75) Inventors: James W. Keeley, Hollis, NH (US); Douglas E. Sanders, Framingham, MA (US); Daniel W. Meyer, Brentwood, CA (US); Andrew Hyonil Chong, San Jose, CA (US); Ju-Ching Tang, Fremont, CA (US)

(73) Assignee: LSI Corporation, San Jose, CA (US)

( * ) Notice: Subject to any disclaimer, the term of this patent is extended or adjusted under 35 U.S.C. 154(b) by 502 days.

(21) Appl. No.: 12/475,694

(22) Filed: Jun. 1, 2009

(65) Prior Publication Data

US 2010/0303084 A1 Dec. 2, 2010

(51) Int. Cl.
*H04J 3/02* (2006.01)

(52) U.S. Cl. ........................................................ 370/462

(58) Field of Classification Search ................... 370/461, 370/462, 360
See application file for complete search history.

(56) References Cited

U.S. PATENT DOCUMENTS

| 6,396,832 B1* | 5/2002 | Kranzler ....................... 370/360 |
| 7,463,646 B2* | 12/2008 | Fike et al. ..................... 370/462 |
| 2003/0198251 A1* | 10/2003 | Black et al. ................... 370/462 |

* cited by examiner

*Primary Examiner* — Dang T Ton
*Assistant Examiner* — Kevin Lee
(74) *Attorney, Agent, or Firm* — Duft Bornsen & Fettig LLP (57) ABSTRACT

Apparatus and methods improved fair access to a Fiber Channel Arbitrated Loop (FC-AL) communication medium through a bridge device. The enhanced bridge device provides for a fair access in a currently open access window for all presently requesting devices coupled through the bridge device to the FC-AL communication medium. Thus all devices on the loop whether coupled directly or through a bridge device can be assured fair access to the loop when there are simultaneous requests during an open access window.

18 Claims, 6 Drawing Sheets

"A" (set use_talpa) = leading edge of arb_won AND next_alpa_valid
"B" (clear use_talpa) = !arb_won OR !next_alpa_valid

APPARATUS AND METHODS FOR ACCESS FAIRNESS FOR A MULTIPLE TARGET BRIDGE/ROUTER IN A FIBRE CHANNEL ARBITRATED LOOP SYSTEM

BACKGROUND

1. Field of the Invention

The invention relates generally to Fibre Channel Arbitrated Loop (FC-AL) subsystems and in particular relates to bridge devices and access fairness for devices coupled to the FC-AL communication medium through such a bridge device.

2. Discussion of Related Art

Fibre Channel (FC) communication media and protocols have long been utilized in high speed, high reliability storage system applications. The optical communication transmission communication medium provides enhanced security and noise immunity as compared to similar electrical communications standards. In one particular architecture of the Fibre Channel family of protocols, an arbitrated loop communication medium (i.e., FC-AL communication medium) couples all devices in a loop topology—one to the next. In such a loop topology, information is passed from a source device through all intermediate devices on the loop until an addressed destination device on the loop receives the information and processes it.

In such a loop topology, the FC-AL standards provide for an arbitration sequence such that a device requesting access to FC-AL communication medium applies an arbitration primitive to the loop. If an appropriate response is received on the loop, the device may understand that it has won the arbitration and has temporary exclusive access to the FC-AL communication medium for transmission of information.

In a typical FC storage system, an FC host system (i.e., a SCSI initiator) with an FC host bus adapter (HBA) communicates with a number of FC disk drives (i.e., SCSI targets) in an FC-AL topology. In this topology the FC HBA is normally assigned the Arbitrated Loop Physical Address (ALPA) of zero which is the highest priority within the FC-AL topology with the FC drives each assigned higher numbered (lower priority) Target ALPA (T-ALPA) values. In such a storage system the FC host initiates SCSI commands (e.g., read or write commands) to the FC disk target devices. Disk devices inherently require some processing time to respond to a command (e.g., latency). To increase overall system throughput the FC host could issue SCSI commands concurrently to multiple FC disk targets (or all of them). The FC disk drives then each perform their respective processing and eventually attempt to re-connect to the FC host to provide results of the command processing. This gives rise to the possibility that multiple target devices could be ready to provide a response at the same time. Due to the nature of the FC-AL topology only one target device can access the loop at a time to provide its response. The lowest T-ALPA value presently requesting access to the loop has the highest priority to access the arbitrated loop.

Since the higher priority target can potentially block lower priority targets from loop access the concept of access fairness was added to the FC-AL standard (FC-AL-2). In access fairness each loop port contains an ACCESS history variable. When this variable is true (logic 1) the loop port is allowed to arbitrate for the loop and when false (logic 0) the loop port is prevented from arbitrating for the loop. The ACCESS variable for a port is cleared when the loop port arbitrates and wins access to the loop. After winning such an arbitration this loop port cannot access the loop until again the "access window" closes (i.e., no other loop ports are arbitrating for the loop). Using this scheme a group of fair ports will effectuate a "round robin" priority order with each loop port getting only a single access to the FC-AL communication medium per open access window. This FC-AL standard approach allows all target devices on the loop equal access to the loop.

The access window is considered "open" when one or more fair loop ports are arbitrating for access to the loop, and is considered "closed" when the last loop port within the access window to win arbitration and access to the loop detects that no other loop port is arbitrating for the loop. A loop port winner determines this by using a special ALPA value (0xf0) as the current fill word (the FC word sent between frames) when it wins access to the loop. If another port on the loop is still arbitrating the ARB(0xf0) value will be replaced with the ARB(T-ALPA) value of the requesting target device's T-ALPA value. The present arbitration winner on the loop will detect this condition (i.e., does not see an ARB(0xf0) response that it generated on the loop). The present winner thus determines that the access window is still open. If the ARB(0xf0) value is returned to the loop winner it closes the access window by changing the currently fill word to IDLE for a least 2 FC word cycles. The idle fill words traverse the loop and all loop devices clear their respective ACCESS history variables thus allowing a new access window to begin.

Those of ordinary skill in the art are well aware of the FC-AL standards and protocols including the access fairness features provided in the FC-AL-2 standards. All FC and FC-AL standards are well known to those of ordinary skill in the art and are publicly available at, for example, www.t10.org and www.t11.org.

Adoption of lower cost Serial Attached SCSI (SAS) and Serial ATA (SATA) disk drives for storage systems has caused a shift away from more expensive FC drives within storage enclosures. However, in some environments there remains a substantial investment in FC architecture components such as FC HBAs and fiber optic media. To take advantage of the lower cost SAS/SATA disk drives, FC to SAS/SATA bridge or router devices have been developed which allow an FC host controller to communicate with a plurality of FC disk drives in an FC-AL topology though physically connected to the single FC-AL port of the bridging device.

A problem arises in that the bridging device must still provide fair loop access to the multiple T-ALPAs it represents along with other fair T-ALPA ports contained within the same physical loop (e.g., one or more other bridge devices and/or other actual FC drives coupled to the loop). Though a bridging device could be made to provide fair access within its own set of T-ALPAs it would not be able to provide fair access with other fair agents/devices on the loop.

For example, consider a bridging device representing ten T-ALPA values for a single FC port on an arbitrated loop with four other external independent loop ports (e.g., FC devices coupled to the loop each representing one T-ALPA per port). Assume further that these other ports have higher priority (lower T-ALPA values). Further, let's assume the T-ALPAs for all the ports (all fourteen ports for argument sake) have simultaneous requests to access the loop (e.g., multiple disk drives all seeking access to return information for a processed SCSI command). The bridging device will select the lowest of its ten T-ALPAs (i.e., the highest priority among the devices coupled through the bridge device) and arbitrate with the other four T-ALPA values on the loop. Due to the priority algorithm the four external ports win access to the loop ahead of the bridging device and then wait for the access window to close. The bridging device will then win access to the loop with its lowest T-ALPA value (highest priority) but also ends up closing the access window on itself even though it has nine other T-ALPAs with requests. There is no allowance in the existing FC-AL standards to be the current arbitration winner and to also make another, new access request. Because of this limitation, as soon as the bridging device is done with the request for its highest priority requesting T-ALPA the other external ports will be able to join in next access window. This ends up being unfair to the devices coupled to the loop through the bridging device. If instead there were ten separate ports for the ten devices coupled to the bridge, all ten T-ALPAs (plus the other four T-ALPAs) would have been able to access the loop within the access cycle before the window closed and allowed the other four external ports to have access to the loop again.

One approach to assuring access fairness to all devices is to limit an FC-AL system configuration to a single FC host coupled to the loop and a single bridge device through which all other devices are coupled to the loop. Such a configuration is highly inflexible and lacks the ability to easily scale a system.

Thus it is an ongoing challenge to provide fair access to devices coupled to an FC-AL communication medium through a bridge device.

SUMMARY

The present invention solves the above and other problems, thereby advancing the state of the useful arts, by providing methods and apparatus for assuring fair access to all devices on an FC-AL communication medium including devices coupled through a bridge device. The bridge device is enhanced to assure that all devices associated with T-ALPAs managed by the bridge device have an opportunity to arbitrate for access to the loop before an access widow is closed.

In one aspect hereof, a bridge device is provided for coupling multiple devices to a Fibre Channel Arbitrated Loop (FC-AL) communication medium. The bridge device includes a Fibre Channel layer 2 logic circuit adapted to implement Fibre Channel layer 2 features of the Fibre Channel protocol and adapted to maintain arbitration information for each of multiple Target Arbitrated Loop Physical Addresses (T-ALPAs) managed by the bridge device. The arbitration information includes a request indicator for each of the multiple T-ALPAs and an access window indicator for each of the multiple T-ALPAs. The Fibre Channel layer 2 logic circuit is further adapted to generate arbitration signals derived from the arbitration information. The bridge device also includes an FC-AL layer logic circuit including a Loop Port State Machine logic circuit. The Loop Port State Machine logic circuit coupled to receive the arbitration signals and adapted to control arbitration exchanges on the FC-AL communication medium. The Loop Port State Machine logic circuit is further adapted to provide access fairness for all T-ALPAs managed by the bridge device based on the arbitration signals in cooperation with access fairness provided by any other devices coupled to the FC-AL communication medium.

Another aspect hereof provides a method operable in a bridge device adapted to couple a plurality of devices to a Fibre Channel Arbitrated Loop (FC-AL) communication medium. The method includes providing arbitration information in a Fibre Channel layer 2 logic circuit of the bridge device for each of multiple Target Arbitrated Loop Physical Addresses (T-ALPAs) managed by the bridge device. The arbitration information including a request indicator for each of the multiple T-ALPAs and an access window indicator for each of the multiple T-ALPAs. The method also includes generating arbitration signals in the Fibre Channel layer 2 logic circuit derived from the arbitration information and applying the arbitration signals to an FC-AL layer logic circuit of the bridge device. The FC-AL layer logic circuit includes a Loop Port State Machine. The method further includes utilizing the arbitration signals within the FC-AL layer logic circuit to control arbitration exchanges in the FC-AL communication medium to control arbitration exchanges on the FC-AL communication medium to provide access fairness for all T-ALPAs managed by the bridge device based on the arbitration signals in cooperation with access fairness provided by any other devices coupled to the FC-AL communication medium.

DETAILED DESCRIPTION OF THE DRAWINGS

Figure 1:
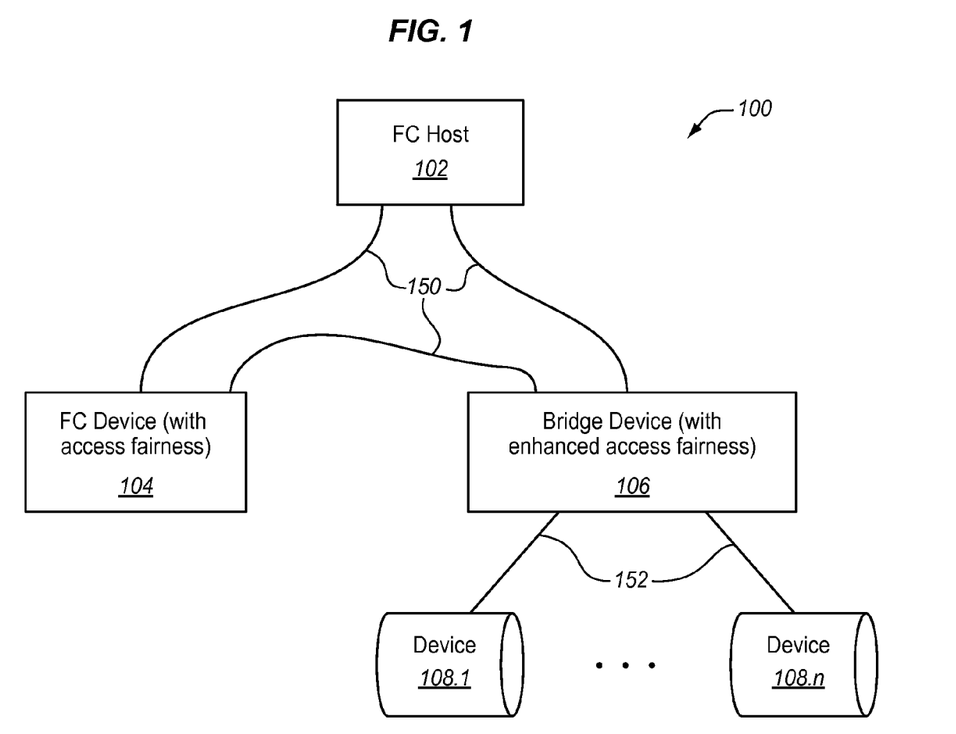
FIG. 1 is a block diagram of a system including an FC-AL bridge device enhanced in accordance with features and aspects hereof to provide fair access to the loop for all devices.

FIG. 1 is a block diagram of a system 100 incorporating an enhanced bridge device 106 for coupling a plurality of devices 108.1 through 108.*n* to a Fibre Channel communication medium 150. In particular, bridge device 106 includes enhanced access fairness features and aspects hereof to provide coupling of multiple devices 108.1 through 108.*n* to a Fibre Channel Arbitrated Loop 150 in conjunction with one or more other Fibre Channel devices 104 also implementing access fairness features in accordance with FC-AL specifications.

Bridge device 106 is coupled with FC-AL communication medium 150 via an appropriate interface and couples to one or more devices 108.1 through 108.*n* via corresponding communication media 152. In one exemplary embodiment, devices 108.1 through 108.*n* may be storage devices such as disk drives or other suitable storage devices for storage of data on behalf of the host system 102. For example, devices 108.1 through 108.*n* may each be a Fibre Channel storage device such that bridge device 106 couples multiple such Fibre Channel storage devices to FC-AL communication medium 150. In such a case, communication medium 152 may be an appropriate Fibre Channel communication media for communicating with each of the Fibre Channel storage devices 108.1 through 108.*n*. In another exemplary embodiment, devices 108.1 through 108.*n* may be non-Fibre Channel storage devices (such parallel or serial attached SCSI, parallel or serial attached ATA, etc.). In such an embodiment, communication 152 may be an appropriate communication medium including, for example, parallel SCSI, parallel ATA, serial attached SCSI (SAS), serial ATA (SATA), etc. In such an exemplary embodiment bridge device 106 also provides translation between Fibre Channel protocols and corresponding protocols utilized by the non-Fibre Channel storage devices 108.1 through 108.*n*. Bridge device 106 associates a unique T-ALPA with each of the non-Fibre Channel storage devices 108.1 through 108.n for purposes of communication on the FC-AL communication medium 150.

In general, a Fibre Channel host system 102 may issue requests to any device 104 and 108.1 through 108.n by addressing the device using its corresponding Target Arbitrated Loop Physical Address (T-ALPA). As described above, the devices on the FC-AL communication medium 150 that comply with the access fairness standards of the FC-AL protocol specifications help assure that each device has a fair opportunity to arbitrate for control of the FC-AL communication medium 150 during an access window defined by the arbitration protocol exchanges.

As noted above, prior implementations of bridge devices failed to adequately address the access fairness protocol aspects of the FC-AL standards in that devices coupled to such a prior bridge device design did not fully participate in the access fairness provisions of FC-AL-2. Prior bridge devices arbitrated on behalf of all devices they served to couple to loop such that only the highest priority (lowest T-ALPA) of simultaneously requesting devices could participate in arbitration in a single access window. Other devices coupled to the bridge device and also requesting access would have to await a next access window.

By contrast to prior bridge design that were so limited, the enhanced bridge device 106 allows all devices 108.1 through 108.n coupled through it to the loop to arbitrate within a single access window along with other devices on the loop (including other bridge devices). Thus, the enhanced bridge device 106 provides access fairness as intended by the FC-AL specifications for all devices associated with T-ALPAs on the loop despite the presence of a bridge device coupling some of the devices to the loop.

Those of ordinary skill in the art will readily recognize numerous configurations of the system 100 that may incorporate any number of bridge devices 106 in conjunction with any number of other Fibre Channel devices 104. Further, each such bridge device may provide for coupling of any desired number of devices 108.1 through 108.n limited only by the total number of logical ports and physical loop addresses associated with the FC-AL communication medium 150.

Figure 2:
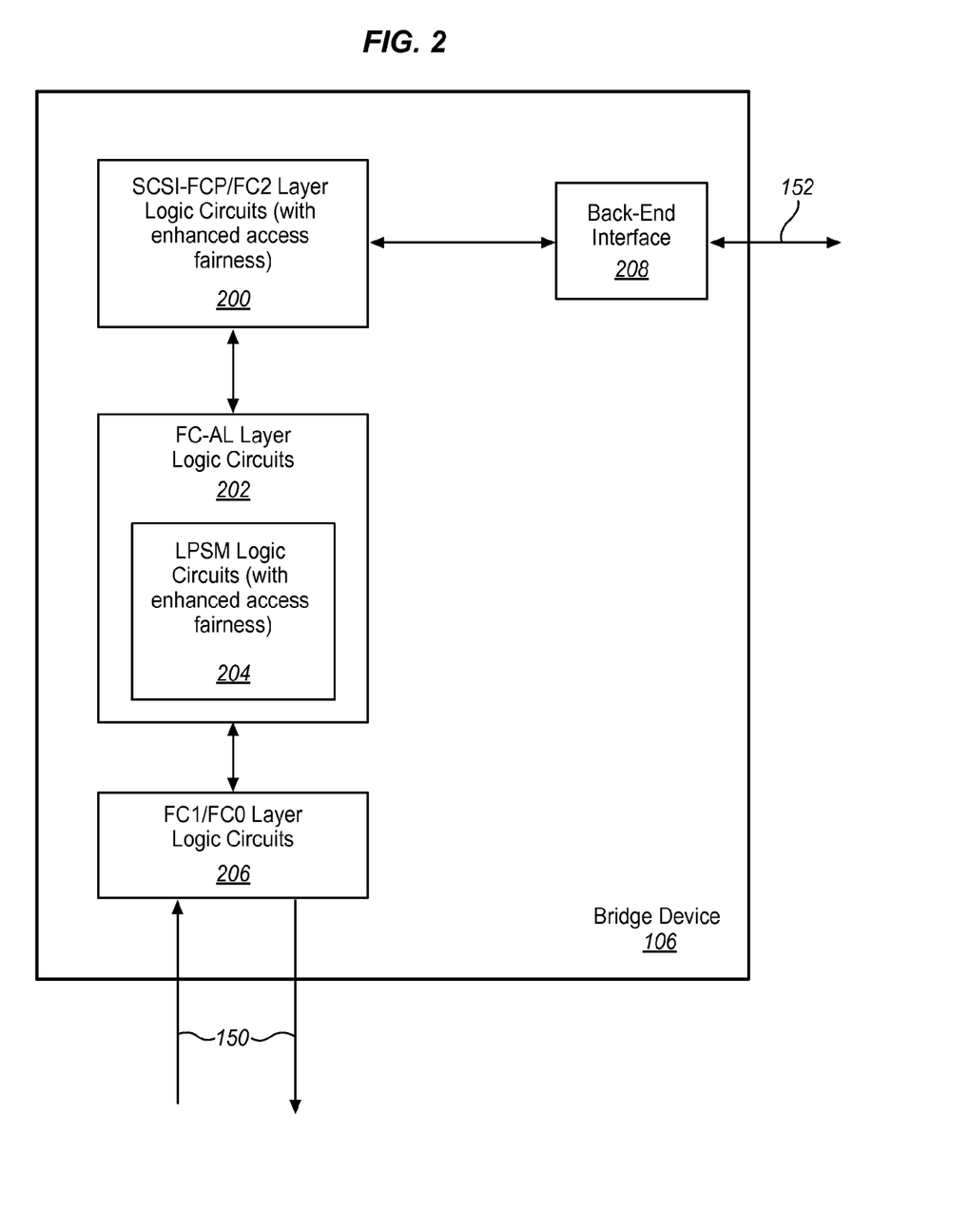
FIG. 2 is a block diagram providing exemplary additional details of the structure of an enhanced bridge device in accordance with features and aspects hereof.

FIG. 2 is a block diagram providing additional exemplary details of an enhanced bridge device 106 of FIG. 1. Enhanced bridge device 106 may include higher layer logic circuits 200 for implementing the SCSI-FCP (SCSI Fibre Channel Protocol) and Fibre Channel layer 2 (FC-2) protocols of the Fibre Channel standard. Circuits 200 are enhanced in accordance with features and aspects hereof to provide improved access fairness in conjunction with other circuits and functions of the enhanced bridge device 106. Higher layer logic circuits 200 may couple with a backend interface circuit 208 for coupling the higher layer logic circuits 200 with devices (not shown) via communication medium 152. As noted above, backend interface 208 and communication medium 152 may be any suitable circuits for coupling and communicating with storage devices or other devices attached to the enhanced bridge device 106.

Higher layer logic circuits 200 may also couple with FC-AL layer logic circuits 202 which may, in turn, comprise Loop Port State Machine (LPSM) logic circuits 204. The higher layer logic circuits 200 and the LPSM circuits 204 within the FC-AL logic layer circuits 202 may cooperatively implement the enhanced access fairness features and aspects hereof within bridge device 106. Higher layer logic circuits 200 and FC-AL layer logic circuits 202 are also coupled with lower layer logic circuits 206 for implementing Fibre Channel layer 1 (FC-!) and Fibre Channel layer 0 (FC-0) of the Fibre Channel protocol. The FC-1/FC-0 layer logic circuits 206 may couple with the FC-AL communication medium 150 for exchanging Fibre Channel information over the loop communication medium.

In operation, Fibre Channel layer 2 logic circuits 200 may maintain arbitration information for each of the multiple T-ALPAs managed by the bridge device 106. The arbitration information may include a request indicator for each of the multiple T-ALPAs and an access window indicator for each of the multiple T-ALPAs. In one exemplary embodiment, a request bit vector may be maintained where each bit of the vector indicates a request to access the FC-AL communication medium 150 by a corresponding device assigned to a corresponding T-ALPA. The T-ALPA value corresponding to a bit may be represented by the index position of the corresponding bit in the request bit vector. In like manner, an access window bit vector may be maintained where each bit represents the access window status for a corresponding T-ALPA (the T-ALPA value corresponding to the bit position index in the vector). Those of ordinary skill in the art will recognize numerous equivalent data/circuit structures in a Fibre Channel layer 2 logic circuit 200 for maintaining the arbitration information for each of the multiple T-ALPAs managed by the bridge device 106.

Those of ordinary skill in the art will also readily recognize that the depicted, exemplary circuits of Fibre Channel layer logic circuits (200, 202, 204, and 206) may be integrated as a single customized integrated circuit or may be implemented in various combinations of integrated circuits and discrete components. A variety of commercially available circuits implementing some or all of these various Fibre Channel circuits are well known to those of ordinary skill in the art.

In the exemplary embodiment depicted in FIG. 2, the enhanced access fairness features may be implemented as cooperating modifications or enhancements within the logic components implementing the higher layer logic circuits 200 (FC-2) and within the LPSM logic circuits 204 of the FC-AL layer logic circuits 202.

Figure 3:
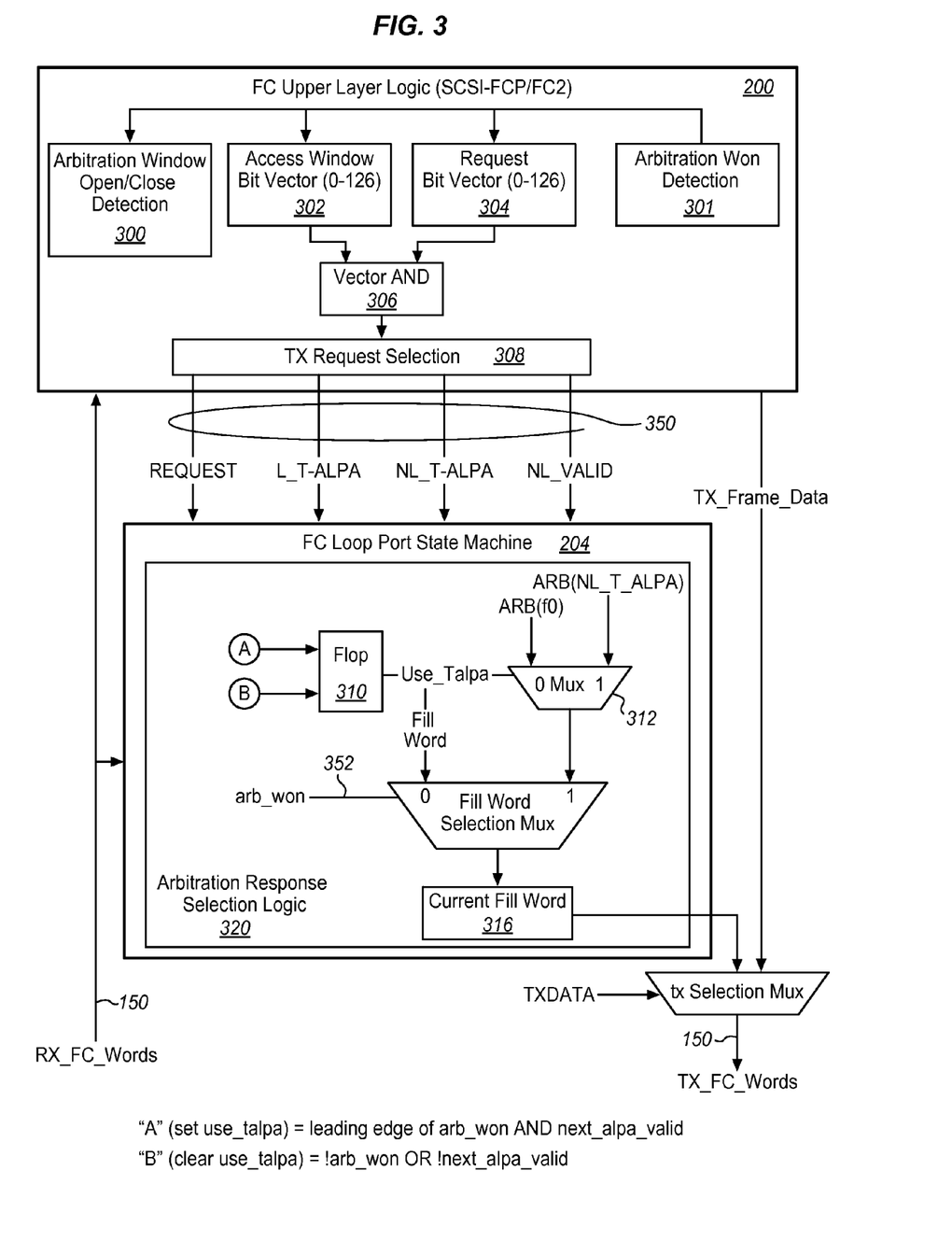
FIG. 3 is a block diagram providing exemplary additional details of circuits within an FC interface of the enhanced bridge device of FIGS. 1 and 2.

FIG. 3 is a block diagram of an exemplary embodiment of the enhanced access fairness features and aspects hereof as embodied within a Fibre Channel higher layer logic circuit 200 (e.g., SCSI-FCP/FC-2 logic circuits) and a Fibre Channel LPSM logic circuit 204. Higher layer logic 200 may be implemented substantially in accordance with corresponding FC-AL standards enhanced to provide access fairness features in accordance with features and aspects hereof. Higher layer logic circuits 200 is responsible for, among other functions, prioritizing and transmitting requests for the multiple T-ALPAs that are managed by the bridge device according to the FC-AL access fairness rules. Circuits 200 generate arbitration signals 350 for application to LPSM logic circuits 204 to cooperatively manage the arbitration enabling fair access to each arbitration window by all devices on the loop and all devices coupled to the loop through the bridge device.

Higher layer logic circuits 200 store and maintain arbitration information relating to each of the multiple T-ALPAs managed by the bridge device. For example, higher layer logic circuits 200 may include a memory 302 for storing the access window indicator for each of a possible 127 T-ALPAs managed by the bridge device. In addition, the higher layer logic circuits 200 may include a memory 304 for storing request indicators for each of the possible 127 T-ALPAs managed by the bridge device. Such requests are detected through exchanges with the back-end interface (not shown) coupled with the higher layer logic circuits 200 (as exemplified in FIG. 1). In one exemplary embodiment, memory 302 and 304 may each be implemented as a 127 bit register (e.g., an ACCESS register/vector and a REQUEST register/vector) representing an access window bit vector and a request bit vector, respectively, where each bit of the registers represents the access or request status, respectively, of a corresponding device coupled to the bridge device (i.e., through the back-end interface). The bit index position in such a vector may correspond to the T-ALPA value of the device. Those of ordinary skill will recognize numerous other memory/circuit structures that may be used to store such arbitration information for the multiple T-ALPAs managed by the bridge device. For most cases only a subset of the possible 127 T-ALPAs in an FC-AL application would be valid for a given FC port with only a relatively small subset of those having simultaneous transmit requests. Thus other memory/circuit structures may be employed given the common, practical limitations in the number of T-ALPAs actually managed in common applications and the still smaller subset of those T-ALPAs likely to request access simultaneously.

Under control of an arbitration window open/close detection circuit 300 and in response to sensing an open access window (in accordance with FC-AL-2 standards), the two vectors (302 and 304—i.e., arbitration information) are applied to vector AND function 306 to produce a resultant bit vector (e.g., also 127 bits wide). In the resultant vector, only active T-ALPA requests that have there corresponding access bit set will have a corresponding bit set in the resultant vector. Only the T-ALPAs having corresponding bits set in the resultant vector are valid within a current access window. Transmit request selection logic circuit 308 then selects the active request (if any) having the lowest T-ALPA value (i.e., the lowest bit position index in the resultant vector and thus the highest priority on the loop). If there is any such requesting T-ALPA that may arbitrate in the current access window, the REQUEST bit is set by circuit 308 for application to the LPSM 204 and the T-ALPA value of that requesting device is applied to the LPSM 204 as L_T-ALPA. Circuit 308 also selects the next lowest active request (represented as the next lowest T-ALPA value with a bit set in the resultant vector) and, if there is such a requesting T-ALPA, sets NL_VALID for application to the LPSM 204 and applies the T-ALPA value (e.g., bit position in the resultant vector) of such a next lowest requesting device to the LPSM 204 as NL_T-ALPA. Collectively, REQUEST, L_T-ALPA, NL_T-ALPA, and NL_VALID are referred to herein as arbitration signals 350. The arbitration signals 350 are derived from the arbitration information (e.g., vectors 302 and 304).

In the exemplary embodiment of bit vectors used to represent requests and access window status, these requests may be prioritized as follows:

L_T-ALPA=lowest valid T-ALPA that is set (where bit 0 is the lowest and bit 127 highest)

NL_T-ALPA=next lowest valid T-ALPA that is set (where bit 0 is the lowest and bit 127 highest)

If REQUEST is set, the LPSM 204 will operate to arbitrate for the loop using the supplied L_T-ALPA value. Arbitration won detection circuit 301 detects if the arbitration is won. Once arbitration is won circuit 301 sets the ARB_WON 352 signal and clears the bit in vectors 302 and 304 corresponding to the T-ALPA (L_T-ALPA) for which the arbitration is won. Clearing the bit corresponding to L_T-ALPA in the access window bit vector 302 indicates that that this T-ALPA (L_T-ALPA) has had access during the current access window and cannot arbitrate again until a next window is opened—after all other devices on the loop and coupled to the bridge device 106 have also had an opportunity to arbitrate for the loop.

The arbitration window open/close detection circuit 300 of higher layer logic circuit 200 may monitor the received FC words (on path 150) and if it detects that the access window has closed (i.e., a least one IDLE FC word is received) all the bits in the ACCESS vector 302 are unconditionally set indicating to the transmit request logic that the current access window is closed and a new access window has started.

The LPSM 204 may be implemented in accordance with the FC-AL-2 standard (including access fairness features) enhanced in accordance with features and aspects hereof with a change to the current fill word logic. The enhanced logic allows an ARB(NL_T-ALPA) fill word versus the normal ARB(0xf0) when the LPSM 204 has won arbitration.

In a prior bridge device implemented and operating without the enhancements of the present invention, the LPSM would arbitrate for the loop with the ARB(L_T-ALPA) value as the current fill word in accordance to FC-AL arbitration rules. Once it has won arbitration (ARB_WON history variable is set), it would then change the current fill word to an ARB(0xf0). If the ARB(0xf0) value traverses the FC-AL loop and is received by the arbitration winner it indicates that there are no other ports on the loop which require access for this access window and the arbitration winner then changes the current fill word to "IDLE" which causes all the ports on the loop to set their "ACCESS" history variable indicating start of a new access window. These standard state transitions of prior bridge devices are well known to those of ordinary skill in the art and documented in FC-AL-2 specifications.

For an exemplary enhanced bridge device that manages multiple T-ALPAs with multiple requests pending in accordance with features and aspects hereof, when the LPSM is the arbitration winner it does not always change the current fill word to an ARB(0xf0) and close the access window on itself. Rather, the enhanced LPSM 204 changes the current fill word to ARB(NL_T-ALPA). This will keep the current access window open and allow the next lowest T-ALPA (NL_T-ALPA if NL_VALID is set) to participate in the current access window insuring fairness for all T-ALPAs for any port within the FC-AL loop.

LPSM 204 enhancements in accordance with features and aspects hereof are exemplified in arbitration response selection logic circuit 320. Circuit 320 comprises a multiplexer 312 having one input applied as an ARB(NL_T-ALPA) FC primitive and the other input applied as an ARB(0xf0) FC primitive. Mux 312 selection input ("Use_Talpa") is applied from a single bit storage element 310 (e.g., a flip flop). Flip flop 310 is set (logic 1) on the logic 0 to logic 1 transition of the ARB_WON 352 (i.e., when the bridge device port has won access to the loop with the L_T-ALPA) and the higher layer logic circuit 200 has the NL_VALID indicator set true (logic 1). This logical condition is represented as label "A". Flip flop 310 is unconditionally cleared when ARB_WON 352 or NL_VALID goes false (logic 0). This logical condition is represented as label "B".

The selected fill word output of mux 312 is applied as an input to fill word selection mux 314 and a default fill word (e.g., IDLE) is applied as another input. The ARB_WON 352 signal is applied to mux 314 to select the desired fill word when arbitration is won or lost. When ARB_WON 352 is true (logic 1) the fill word output from mux 312 is applied as the output of mux 314. ARB(0xf0) indicates that no other device coupled with this enhanced bridge device is also requesting access. ARB(NL_T-ALPA) indicates the T-ALPA of a next device coupled to the bridge that is presently requesting access to the loop. When ARB_WON 352 is false (logic 0—i.e., no device coupled to the bridge device won the arbitration in the currently open access window) the default fill word (e.g., IDLE) is applied as the output of mux 314 as defined by the FC-AL-2 specification. Current fill word 316 is a register or other memory element to store the presently selected fill word based on the arbitration status of the LPSM 204. The current fill word stored in 316 is applied as an input to transmit selection mux 318 and the normal frame data is applied as another input to mux 318. Other standard logic (not shown) in LPSM logic circuits 204 detects when a start of frame (SOF) is applied to the transmit data signal received from higher layer logic circuits 200 and asserts a TXDATA signal to mux 318 to assure the generated frame data is transmitted to the loop communication medium 150. When the end of frame is sensed by the logic, TXDATA is de-asserted to select mux 318 to apply arbitration and other related signals from LPSM logic circuits 204 to be applied to the loop communication medium 150.

The higher layer logic circuit 200 does not have to provide a next lowest T-ALPA (NL_T-ALPA) value at the time it initially detects a REQUEST from a lowest requesting T-ALPA (L_T-ALPA). Rather, it must provide such a NL_T-ALPA value before the LPSM wins arbitration (logic 0 to 1 edge of the ARB_WON 352 signal) in order to prevent the possibility that the access window could close.

Those of ordinary skill in the art will readily recognize numerous equivalent and additional elements and circuits in a fully functional FC-AL interface component of the enhanced bridge device as described above with respect to FIGS. 1-3. For example, circuits and logic associated with other standard features of the FC-AL protocols are omitted herein since such designs are well known to those of ordinary skill in the design of FC components and logic. Such additional and equivalent elements are omitted herein for simplicity and brevity of this discussion. Further, those of ordinary skill in the art will recognize that the features of FIGS. 1-3 may be designed as tightly integrated within a single integrated circuit or may be implemented as multiple components coupled through appropriate signal interface bus structures. Such design choices will be readily apparent to those of ordinary skill.

Figure 4:
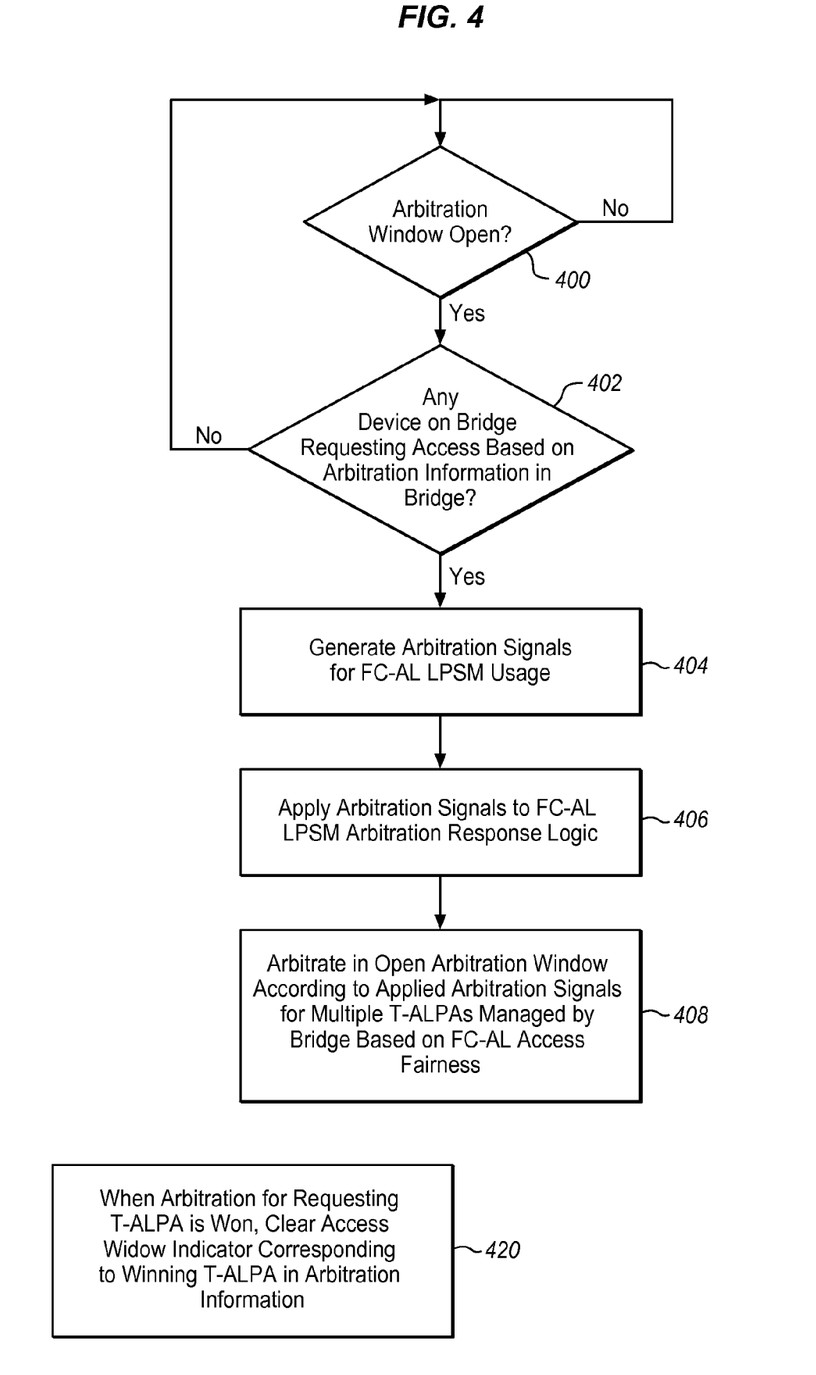
FIGS. 4 through 6 are flowcharts of exemplary methods for enhanced fair access in arbitration of devices to gain access to an FC-AL communication medium.

FIG. 4 is a flowchart describing an exemplary method in accordance with features and aspects hereof. The method of FIG. 4 may be operable in a bridge device such as enhanced bridge device 106 exemplified in FIGS. 1-3 described above. More specifically, the enhanced access fairness processing represented by the exemplary method of FIG. 4 may be operable in part within enhanced logic circuits in the higher layer logic circuits of an FC interface component of the bridge device (e.g., the SCSI-FCP/Fibre Channel layer 2 logic circuits of an FC interface circuit of the bridge device). The method is also operable in part in lower layer logic circuits such as the LPSM circuits within an FC-AL layer logic component of the FC-AL interface logic in the bridge circuit device.

Substantially in parallel with other processing within the bridge device, step 400 awaits detection of an open access window on the FC-AL communication medium. An open access window is detected in accordance with FC-AL standards typically within the higher layer logic circuits (e.g., Fibre Channel layer 2 processing) of the FC-AL interface circuits of the bridge device. Upon detection of an open access window, step 402 determines whether any device coupled to the bridge device (and hence associated with a T-ALPA managed by the bridge device) is presently requesting access to the FC-AL. The higher layer logic circuits (e.g., the Fibre Channel layer 2) may maintain arbitration information for each of the multiple T-ALPAs managed by the bridge device. As discussed above, arbitration information may include, for example, a request indicator for each T-ALPA indicating whether a device presently associated with a corresponding T-ALPA and coupled to the bridge device is requesting access to the FC-AL communication medium. The arbitration information may also include an access window indicator for each T-ALPA indicating whether a device presently associated with a corresponding T-ALPA and coupled to the bridge device may participate arbitrating in the presently open access window. In an exemplary embodiment where the arbitration information is maintained as a request bit vector and an access bit vector where each bit corresponds to a T-ALPA value, the determination of step 402 may comprise logical ANDing of the two vectors to determine which presently requesting T-ALPA is also permitted to arbitrate in the currently open access window.

If step 402 determines that no device coupled to the bridge device is presently requesting access to the FC-AL communication medium, a standard response to the open access window is generated in accordance with FC-AL standard communication protocols and processing continues looping back to step 400 to await the next arbitration window.

If step 402 determines that some device coupled to the bridge is presently requesting access based on the arbitration information, step 404 next generates arbitration signals within the higher layer (e.g., Fibre Channel layer 2 logic) for application to the lower layer processing circuits of the FC-AL interface circuits. The generated arbitration signals are derived from the arbitration information maintained in the higher layer logic circuits. In particular, a REQUEST signal may be generated indicating that some device is presently requesting access to the FC-AL communication medium. Another signal may indicate the particular T-ALPA value for that highest priority requesting device (L_T-ALPA). Still other signals will indicate whether a next highest priority device is also requesting access to the FC-AL communication medium. Step 406 applies the generated arbitration signals to the LPSM circuits within the FC-AL layer logic.

An arbitration response logic component within the LPSM enhanced in accordance with features and aspects hereof receives the arbitration signals and responds to the open access window on the FC-AL communication medium at step 408 in accordance with the applied arbitration signals. The response generated for the open access window at step 408 may comprise detecting when an arbitration has been won for the presently requesting device and responding to the open access window with an appropriate signal to permit access fairness to all devices coupled to the FC-AL communication medium (including all devices coupled with the bridge device). The processing of FIG. 4 is then completed until a next access window is detected to commence processing at step 400 again.

In conjunction with the processing of the method of FIG. 4 and other processing of the bridge device, step 420 is operable to clear the access window indicator for the T-ALPA that just won an arbitration to gain access to the FC-AL communication medium.

Those of ordinary skill in the art will readily recognized numerous additional and equivalent steps performed in fully functional Fibre Channel interface circuits within an enhanced bridge device. Such additional and equivalent steps are omitted herein for simplicity and brevity of this discussion.

As noted above in one exemplary embodiment, the arbitration information may be stored in a memory comprising a request bit vector and an access window bit vector where each vector may comprise a plurality of bits each corresponding to one of the multiple T-ALPAs managed by the bridge device. The bit index position of a bit in the vectors indicates the particular T-ALPA value with which it corresponds. A bit set in the request bit vector indicates that the corresponding T-ALPA associated with a device coupled with the bridge device is presently requesting access to the FC-AL communication medium. A bit set in the access window bit vector indicates that the corresponding T-ALPA associated with a device coupled to the bridge device may arbitrate within the presently open access window. Further as described above, such bit vector memories may be implemented as registers or other suitable memory structures capable of storing bits for up to 127 possible T-ALPAs managed by an enhanced bridge device.

Figure 5:
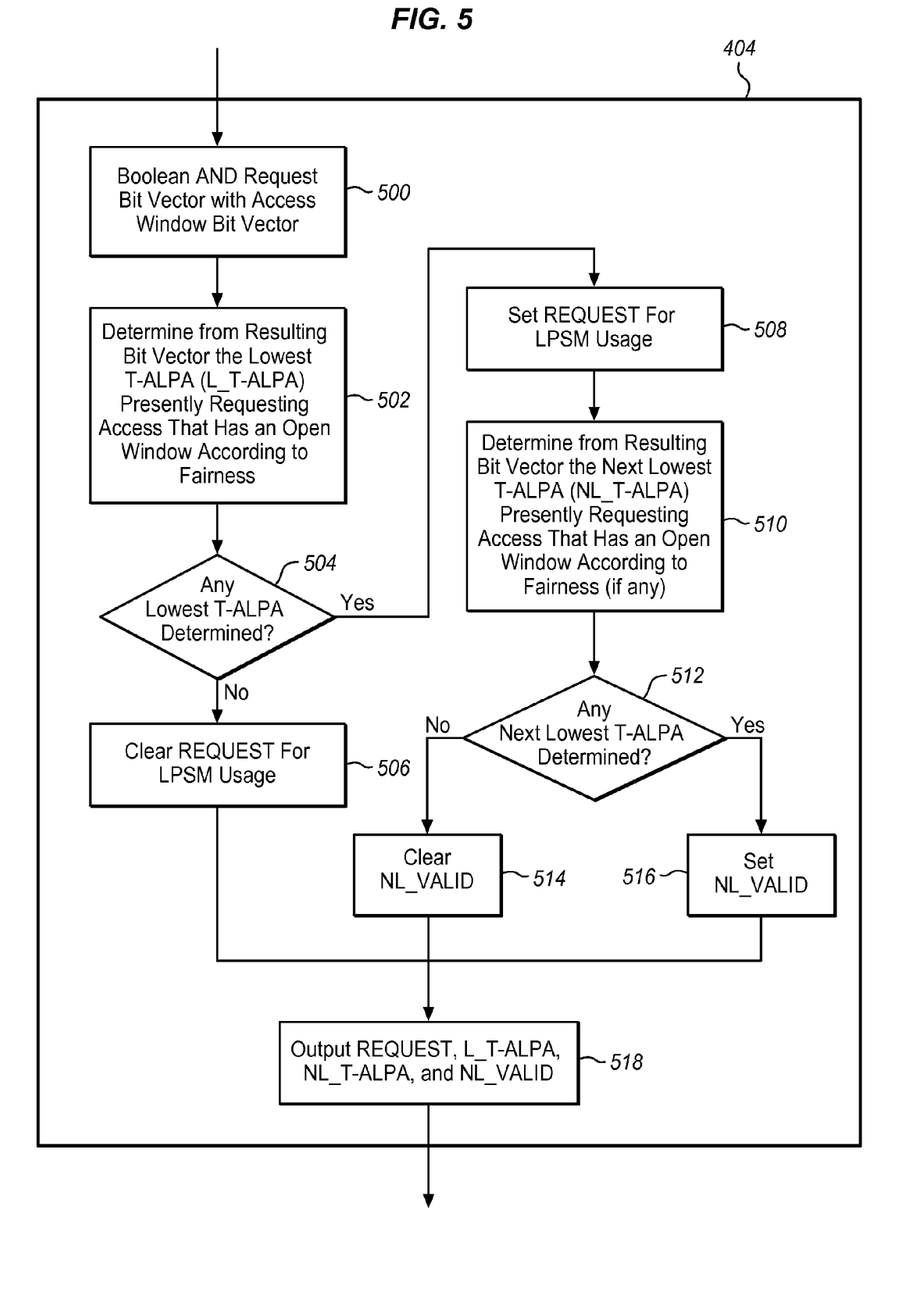

In the context of such a memory structure for representing the arbitration information, FIG. 5 is a flow chart providing exemplary additional details for the processing of step 404 of FIG. 4 to generate arbitration signals within the higher layer logic circuits of the Fibre Channel interface component in the bridge device for application to the lower layer (e.g., enhanced LPSM) circuits of the bridge device. Step 500 performs a Boolean AND operation of all bits in the request bit vector with each corresponding bit in the access window bit vector. The resultant vector comprises, for example, 127 bits indicating which devices are presently requesting access to the FC-AL communication medium and also may arbitrate within a presently open access window.

In accordance with FC-AL standards, the lower T-ALPA values have higher priority for access fairness relative to the higher T-ALPA values. Thus, step 502 determines from the resultant bit vector produced by step 500 the lowest T-ALPA value (L_T-ALPA) presently requesting access that also may arbitrate in the presently open access window. Step 504 next determines whether any such T-ALPA is presently requesting access to the loop. If no such device is presently requesting access to the loop, step 506 clears the REQUEST arbitration signal for later application to the LPSM. Processing continues its step 518 to output the generated arbitration signals for use by the LPSM of the Fibre Channel circuit.

If step 504 determines that some device is presently requesting access to the FC-AL communication medium and has an open access window, step 508 sets the REQUEST arbitration signal for later application to the LPSM. Step 510 then determines from the resultant vector generated by step 500 the next lowest T-ALPA (NL_T-ALPA) presently requesting access that also has an open access window (if any such next lowest priority device is so requesting). Step 512 determines whether any such next lowest T-ALPA is presently requesting access to the FC-AL communication medium and has an open access window. If not, step 514 clears the NL_VALID arbitration signal. If so, step 516 sets the NL_VALID arbitration signal. In both cases, processing continues with step 518 to output all of the generated arbitration signals including, for example, REQUEST, the lowest T-ALPA value of a qualified device presently requesting access (L_T-ALPA if any), the next lowest T-ALPA value of another qualified device presently requesting access (NL_T-ALPA if any), and an indicator that the next lowest T-ALPA value is also valid (NL_VALID).

Figure 6:
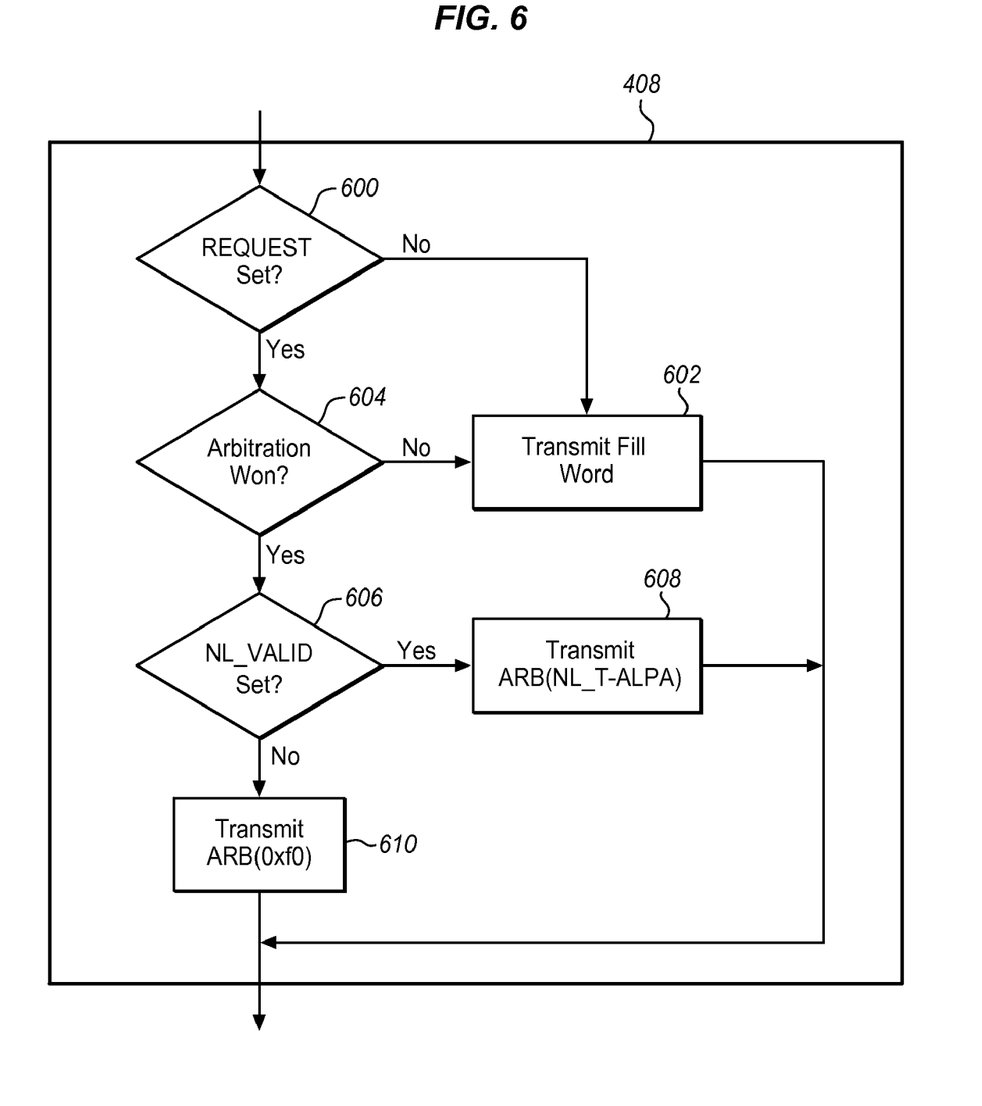

FIG. 6 is if flowchart describing exemplary additional details of the processing of step 408 of FIG. 4 to generate and transmit an appropriate response to an open access window detected on the FC-AL communication medium. As indicated above, the enhanced arbitration response logic operable within the LPSM circuits of the FC-AL lower layer logic of the bridge device may receive the arbitration signals including, for example, a REQUEST bit indicating that some device has requested access to the FC-AL and is permitted to arbitrate for the loop in a current open access window. Step 600 therefore determines whether the REQUEST arbitration signal has been set. If not, step 602 transmits a default fill word in accordance with Fibre Channel FC-AL standards (e.g., and IDLE fill word or other fill word utilized in accordance with the FC-AL standards). If the REQUEST bit is set as determined by step 600, step 604 determines whether the arbitration rules of the FC-AL standards indicate that the requesting T-ALPA has won the arbitration. If not, step 602 generates and transmits an appropriate fill word as indicated above.

If arbitration for the presently requesting T-ALPA has been successful, step 606 next tests whether the NL_VALID arbitration signal has been set by the higher layer logic of the GC-AL interface. If so, step 608 generates and transmits a response to the arbitration open access window as an ARB primitive with a parameter indicating the next lowest T-ALPA value as provided by the arbitration signals generated by the higher layer logic of the FC-AL interface (i.e., ARB(NL_T-ALPA)). If there is no next lowest T-ALPA presently requesting access, step 610 transmits an ARB FC primitive with a 0xf0 parameter in accordance with FC-AL standards.

In accordance with features and aspects hereof, transmission by step 608 of a next lowest T-ALPA value assures that the next lowest requesting T-ALPA value corresponding to a device coupled with the bridge circuit may also be allowed fair access to the presently open access window. By contrast with prior techniques, all devices coupled with the bridge device and associated with a T-ALPA managed by the bridge device may participate equally with all other devices on the FC-AL communication medium in accordance with the FC-AL fair access standards.

Those of ordinary skill in the art will readily recognize numerous additional and equivalent steps in the methods of FIGS. 4 through 6. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A bridge device for coupling multiple devices to a Fibre Channel Arbitrated Loop (FC-AL) communication medium along with other FC-AL target devices coupled to the FC-AL communication medium, the bridge device comprising:
   a Fibre Channel layer 2 logic circuit to implement Fibre Channel layer 2 features in accordance with Fibre Channel protocols and to maintain arbitration information for each of multiple Target Arbitrated Loop Physical Addresses (T-ALPAs) managed by the bridge device, the arbitration information comprising a request indicator for each of the multiple T-ALPAs and an access window indicator for each of the multiple T-ALPAs, the Fibre Channel layer 2 logic circuit generates arbitration signals derived from the arbitration information; and
   an FC-AL layer logic circuit including a Loop Port State Machine logic circuit, the Loop Port State Machine logic circuit coupled to receive the arbitration signals wherein the Loop Port State Machine logic circuit controls arbitration exchanges on the FC-AL communication medium, wherein the Loop Port State Machine logic circuit provides access fairness for all T-ALPAs managed by the bridge device based on the arbitration signals in cooperation with access fairness associated with said other FC-AL target devices coupled to the FC-AL communication medium.

2. The bridge device of claim 1 wherein the Fibre Channel layer 2 logic circuit further comprises:
a memory to store the request indicator for each of the multiple T-ALPAs and to store the access window indicator for each of the multiple T-ALPAs.

3. The bridge device of claim 2 wherein the memory further comprises:
a request bit vector memory comprising a plurality of request bits, each request bit representing a request indicator indicating whether a corresponding T-ALPA of the multiple T-ALPAs is requesting a transmission on the FC-AL communication medium; and
an access window bit vector memory comprising a plurality of access bits, each access bit representing an access window indicator indicating an access window state of a corresponding T-ALPA of the multiple T-ALPAs.

4. The bridge device of claim 3 wherein the arbitration signals comprise:
a lowest requesting T-ALPA signal indicating a lowest requesting T-ALPA value of the multiple T-ALPAs presently requesting a transmission on the FC-AL communication medium; and
a next lowest requesting T-ALPA signal indicating a next lowest requesting T-ALPA value, if any, of the multiple T-ALPAs presently requesting a transmission on the FC-AL communication medium.

5. The bridge device of claim 4 wherein the plurality of request bits corresponds to the plurality multiple T-ALPAs such that an index of the position of each request bit in the request bit vector memory corresponds to a T-ALPA value,
wherein the plurality of access bits corresponds to the plurality multiple T-ALPAs such that an index of the position of each access bit in the access window bit vector memory corresponds to a T-ALPA value,
wherein the Fibre Channel layer 2 logic circuit generates the lowest requesting T-ALPA signal and the next lowest requesting T-ALPA signal by Boolean ANDing of the request bit vector memory and the access window bit vector memory and identifying the indices of the positions of a lowest set bit and a next lowest set bit in the result of the Boolean AND.

6. The bridge device of claim 1 wherein the arbitration signals comprise:
a lowest requesting T-ALPA signal indicating a lowest requesting T-ALPA value of the multiple T-ALPAs presently requesting a transmission on the FC-AL communication medium; and
a next lowest requesting T-ALPA signal indicating a next lowest requesting T-ALPA value, if any, of the multiple T-ALPAs presently requesting a transmission on the FC-AL communication medium, and
wherein the Loop Port State Machine logic circuit arbitrates on behalf of the lowest requesting T-ALPA and transmits an ARB primitive that comprises the next lowest requesting T-ALPA value, if any, when arbitration is won for the lowest requesting T-ALPA value and transmits an ARB primitive with a 0xf0 when there is no next lowest requesting T-ALPA value when arbitration is won for the lowest requesting T-ALPA value.

7. The bridge device of claim 6 wherein the Loop Port State Machine logic circuit comprises:
arbitration response selection logic to determine a transmission to be forwarded to a next device on the FC-AL communication medium,
wherein the arbitration response selection logic determines the transmission as follows:
if the bridge device fails to win an arbitration on the FC-AL communication medium, then the transmission is a default fill word,
if the bridge device wins an arbitration on the FC-AL communication medium and there is no other T-ALPA managed by the bridge device presently requesting access to the FC-AL communication medium as determined based on the arbitration signals, then the transmission is an ARB primitive with a parameter of 0xf0, and
if the bridge device wins an arbitration on the FC-AL communication medium and there is another T-ALPA managed by the bridge device presently requesting access to the FC-AL communication medium as determined based on the arbitration signals, then the transmission is an ARB primitive with a parameter of a next T-ALPA value presently requesting access to the FC-AL communication medium.

8. A method operable in a bridge device to couple a plurality of devices to a Fibre Channel Arbitrated Loop (FC-AL) communication medium alone with other FC-AL target devices coupled to the FC-AL communication medium, the method comprising:
providing arbitration information in a Fibre Channel layer 2 logic circuit of the bridge device for each of multiple Target Arbitrated Loop Physical Addresses (T-ALPAs) managed by the bridge device, the arbitration information including a request indicator for each of the multiple T-ALPAs and an access window indicator for each of the multiple T-ALPAs;
generating arbitration signals in the Fibre Channel layer 2 logic circuit derived from the arbitration information;
applying the arbitration signals to an FC-AL layer logic circuit of the bridge device, the FC-AL layer logic circuit including a Loop Port logic circuit;
utilizing the arbitration signals within the FC-AL layer logic circuit to control arbitration exchanges in the FC-AL communication medium to control arbitration exchanges on the FC-AL communication medium to provide access fairness for all T-ALPAs managed by the bridge device based on the arbitration signals in cooperation with access fairness associated with said other FC-AL target devices coupled to the FC-AL communication medium.

9. The method of claim 8 wherein the step of generating arbitration signals comprises:
generating a lowest requesting T-ALPA signal indicating a lowest requesting T-ALPA value of the multiple T-ALPAs presently requesting a transmission on the FC-AL communication medium; and
generating a next lowest requesting T-ALPA signal indicating a next lowest requesting T-ALPA value, if any, of the multiple T-ALPAs presently requesting a transmission on the FC-AL communication medium.

10. The method of claim 9 wherein the step of utilizing further comprises:
arbitrating within the Loop Port State Machine logic circuit on behalf of the lowest requesting T-ALPA value;
transmitting an ARB primitive that comprises the next lowest requesting T-ALPA value, if any, when arbitration is won for the lowest requesting T-ALPA value; and transmitting an ARB primitive with a 0xf0 when there is no next lowest requesting T-ALPA value when arbitration is won for the lowest requesting T-ALPA value.

11. The method of claim 9
wherein the step of utilizing further comprises:
arbitrating within the Loop Port State Machine logic circuit on behalf of the lowest requesting T-ALPA value;
if the bridge device fails to win arbitration on the FC-AL communication medium, then transmitting a default fill word,
if the bridge device wins arbitration on the FC-AL communication medium and there is no other T-ALPA managed by the bridge device presently requesting access to the FC-AL communication medium as determined based on the arbitration signals, then transmitting an ARB primitive with a parameter of 0xf0, and
if the bridge device wins arbitration on the FC-AL communication medium and there is another T-ALPA managed by the bridge device presently requesting access to the FC-AL communication medium as determined based on the arbitration signals, then transmitting an ARB primitive with a parameter of the next lowest T-ALPA value.

12. A system comprising:
a Fibre Channel Arbitrated Loop (FC-AL) communication medium;
a Fibre Channel (FC) device coupled to the FC-AL communication medium wherein the FC device implements access fairness features in accordance with FC-AL protocol specifications;
at least one FC-AL target device coupled to the FC-AL communication medium;
a bridge device coupled to the FC-AL communication medium; and
a plurality of devices coupled to the bridge device wherein the bridge device associates one of multiple Target Arbitrated Loop Physical Addresses (T-ALPAs) with each of the plurality of devices,
wherein the bridge device further comprises:
a Fibre Channel layer 2 logic circuit to implement Fibre Channel Layer 2 features of Fibre Channel protocol and to maintain arbitration information for each of the multiple T-ALPAs, the arbitration information comprising a request indicator for each of the multiple T-ALPAs and an access window indicator for each of the multiple T-ALPAs, the Fibre Channel layer 2 logic circuit generates arbitration signals derived from the arbitration information; and
an FC-AL layer logic circuit including a Loop Port State Machine logic circuit, the Loop Port State Machine logic circuit coupled to receive the arbitration signals from the Fibre Channel layer 2 logic circuit wherein the Loop Port State Machine logic circuit controls arbitration exchanges on the FC-AL communication medium and provides access fairness for all T-ALPAs based on the arbitration signals in cooperation with access fairness associated with said at least one FC-AL target devices coupled to the FC-AL communication medium.

13. The system of claim 12
wherein the Fibre Channel layer 2 logic circuit further comprises:
a memory to store the request indicator for each of the multiple T-ALPAs and to store the access window indicator for each of the multiple T-ALPAs.

14. The system of claim 13
wherein the memory further comprises:

a request bit vector memory comprising a plurality of request bits, each request bit representing a request indicator indicating whether a corresponding T-ALPA of the multiple T-ALPAs is requesting a transmission on the FC-AL communication medium; and
an access window bit vector memory comprising a plurality of access bits, each access bit representing an access window indicator indicating an access window state of a corresponding T-ALPA of the multiple T-ALPAs.

15. The system of claim 14
wherein the arbitration signals comprise:
a lowest requesting T-ALPA signal indicating a lowest requesting T-ALPA value of the multiple T-ALPAs presently requesting a transmission on the FC-AL communication medium; and
a next lowest requesting T-ALPA signal indicating a next lowest T-ALPA value, if any, of the multiple T-ALPAs presently requesting a transmission on the FC-AL communication medium.

16. The system of claim 15
wherein the plurality of request bits corresponds to the multiple T-ALPAs such that an index of the position of each request bit in the request bit vector memory corresponds to a T-ALPA value,
wherein the plurality of access bits corresponds to the multiple T-ALPAs such that an index of the position of each access bit in the access window bit vector memory corresponds to a T-ALPA value,
wherein the Fibre Channel layer 2 logic circuit generates the lowest requesting T-ALPA signal and the next lowest requesting T-ALPA signal by Boolean ANDing of the request bit vector memory and the access window bit vector memory and identifying the indices of the positions of the lowest set bit and the next lowest set bit in the result of the Boolean AND.

17. The system of claim 12
wherein the arbitration signals comprise:
a lowest requesting T-ALPA signal indicating the lowest T-ALPA value of the multiple T-ALPAs presently requesting a transmission on the FC-AL communication medium; and
a next lowest requesting T-ALPA signal indicating the next lowest T-ALPA, if any, of the multiple T-ALPAs presently requesting a transmission on the FC-AL communication medium, and
wherein the Loop Port State Machine logic circuit arbitrates on behalf of the lowest requesting T-ALPA and transmits an ARB primitive that comprises the next lowest requesting T-ALPA, if any, when arbitration is won for the lowest requesting T-ALPA and transmits an ARB primitive with a 0xf0 when there is no next lowest requesting T-ALPA when arbitration is won for the lowest requesting T-ALPA.

18. The system of claim 17
wherein the Loop Port State Machine logic circuit comprises:
arbitration response selection logic that determines a transmission to be forwarded to a next device on the FC-AL communication medium,
wherein the arbitration response selection logic determines the transmission as follows:
if the bridge device fails to win an arbitration on the FC-AL communication medium, then the transmission is a default fill word,
if the bridge device wins an arbitration on the FC-AL communication medium and there is no other T-ALPA managed by the bridge device presently requesting access to the FC-AL communication medium as determined based on the arbitration signals, then the transmission is an ARB primitive with a parameter of 0xf0, and if the bridge device wins an arbitration on the FC-AL communication medium and there is another T-ALPA managed by the bridge device presently requesting access to the FC-AL communication medium as determined based on the arbitration signals, then the transmission is an ARB primitive with a parameter of a next T-ALPA value presently requesting access to the FC-AL communication medium.

* * * * *